Feb. 24, 1931. C. JORIOT 1,794,078
SPEED INDICATING AND COMPARING DEVICE FOR VEHICLES
Filed Jan. 17, 1930 3 Sheets-Sheet 1

Inventor:-
Camille Joriot
by
Langner, Parry, Card & Langner
Attys.

Feb. 24, 1931.   C. JORIOT   1,794,078
SPEED INDICATING AND COMPARING DEVICE FOR VEHICLES
Filed Jan. 17, 1930   3 Sheets-Sheet 2
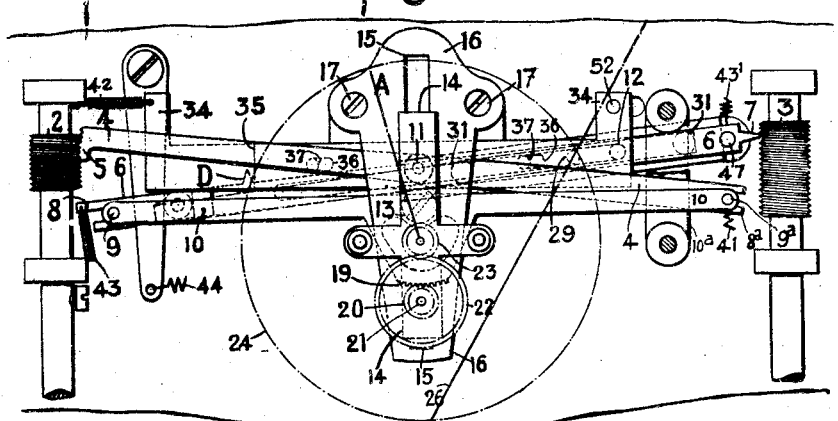

Patented Feb. 24, 1931

1,794,078

UNITED STATES PATENT OFFICE

CAMILLE JORIOT, OF LAC-OU-VILLERS, FRANCE, ASSIGNOR TO FIRM FABRIQUES DES MONTRES ZENITH SUCCESSEURS DE FABRIQUES DES MONTRES ZENITH GEORGES FAVRE-JACOT & CIE., OF LE LOCLE, SWITZERLAND

SPEED INDICATING AND COMPARING DEVICE FOR VEHICLES

Application filed January 17, 1930, Serial No. 421,580, and in Switzerland January 31, 1929.

This invention relates to speed indicating and comparing devices for vehicles.

In general, automobiles, aircraft and vehicles of all kinds are provided with a speed indicating device adapted to indicate the speed of the vehicle at any instant and on the other hand the dash-board of the vehicle carries a clock which indicates the time.

The mean speed to be considered can be ascertained from the relationship between the time required or taken for the journey and the length in kilometres of the journey. The speed of a vehicle varies considerably, either by necessity or voluntarily, but a unit of time is an invariable function.

The apparatus which is the subject of the present invention has for its object to effect a kind of equilibrium between time and the speed of a vehicle in order to ascertain, before or after a journey, the mean speed at which the vehicle should travel or at which it has travelled, so that, for example the driver can regulate the speed of his vehicle in accordance with the length of the journey, for, with the apparatus of the invention the driver will be able to ascertain visibly and consider the advance in or lag behind the the mean speed, at which it is proposed to cover the journey, owing to existing conditions on the route.

With this end in view, the mean speed indicating and comparing device which is the object of the invention comprises two comparative counter-balancing regulating mechanisms, one actuated in accordance with the passage of time and the other in accordance with the speed, the first mechanism being actuated for example by a clock movement, and the second by a speed counter, indifferently whether the clock movement is specially adapted for starting the apparatus or the functions of the rotary movement are directly put in together with the apparatus, the said two comparative counter-balancing regulating mechanisms comprising two independent transfer levers, one adapted to be controlled by the time at one of its lever arms, the other adapted to be controlled by the speed at the arm of the lever opposite to that of the first lever which is controlled by the time.

The said transfer levers have respectively their other lever arms connected to the arms of a floating combining balance lever, so arranged as to combine the oscillating movements of the transfer levers into an equilibrating or balancing movement which is transmitted to an indicating member adapted to indicate observance or non-observance of the desired mean speed, the transfer lever controlled by the speed being provided with a regulating device subject to manual control adapted to permit the effective arm lengths of the said lever to be varied at will in accordance with the speed per hour which it is proposed to maintain.

An embodiment of the invention will now be described by way of example only with reference to the accompanying drawings in which:—

Fig. 1 is a front view of the apparatus, the indicator of the mean speed to be observed being constituted by a pointer A arranged to indicate on an indicating dial the observance or non-observance of the mean speed, the pointer being shown in the zero position which it always assumes when there is equilibrium between the passage of time and the basic speed per hour adopted and indicated by an index on a suitable scale.

Figure 3 is also a front view of the apparatus in which the dial is removed in order to show the various parts of the apparatus, and as shown in this figure there is an un-equilibrium relation in the opposite sense, the hand A being moved towards the left.

Figure 4 is a longitudinal section on the line IV—IV of Figure 1.

Figure 5 is a vertical section on the line V—V of Figure 1.

Figure 6 is a section on the line VI—VI of Figure 1.

Figure 7 is a rear view of a part of the apparatus, on a larger scale.

Figure 1:
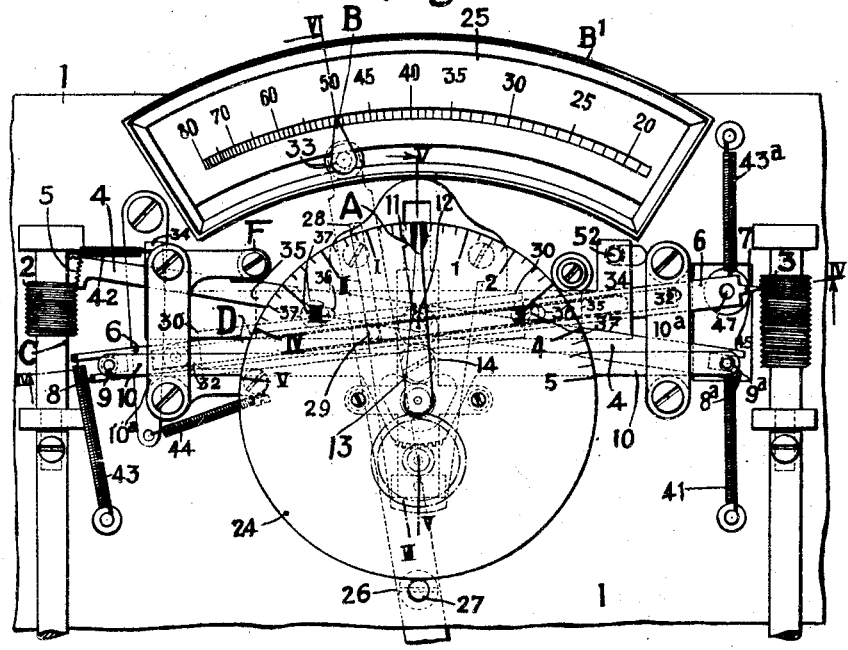

Referring now to the drawings, all the members of the apparatus are mounted upon the base-plate 1. By a suitable control, a clock (not illustrated in the drawings) is arranged to actuate a rotary endless screw 2 (the time side of the apparatus). Another control is arranged to actuate a rotary endless screw 3 (the speed side of the apparatus). It is to be noted that the mode of movement of these members is such that the endless screw 2 makes one complete revolution per hour and the endless screw 3 makes one complete revolution per 50 kilometres travelled by the vehicle, this number of kilometres per hour having been selected as the basic speed per hour.

The endless screw 2 in its rotary movement draws downwards (in the drawing) a transfer lever 4 pivoted at 11, the part of the lever entrained by the screw consisting of a toothed sector 5 engaging with the said endless screw when the apparatus is in condition for operation.

Similarly the endless screw 3 entrains a transfer lever 6 pivoted at 12, but at this side of the apparatus entrainment is effected by a finger 7 for special reasons which will be explained hereinafter, this finger engaging in the threads of the endless screw 3 when the apparatus is in condition for operation.

The transfer levers 4 and 6 have at their other extremities, forks 8 or 8ª respectively, these forks being adapted to accommodate entrainment fingers 9 and 9ª, carried by a combining balance lever 10 which is supported by two double-bridges 10ª. The lever 10 (Figure 3) has for its pivot a compass screw 13 which is pivoted in a slide 14, which is adapted to slide in a rectangular groove 15 of a plate 16 secured by screws 17 on pillars 18 carried by the plate 1.

It has been explained hereinbefore that, through the intermediary of the endless screws 2 and 3, the levers 4 and 6 have their extremities 5 and 7 drawn downwards (in the drawing) and it follows that the forks 8 and 8ª are moved upwards, carrying therewith the lever 10 which can execute not only an oscillating movement around its pivot, but also a translatory movement by displacement of its pivot together with the slide 14 in the groove 15. Under such conditions, if there is equilibrium between the passage of time and the speed as is provided for according to the object of the apparatus, the lever 10 rises horizontally behaving in the manner of a balance beam on which the weights at each side are the same.

On the other hand, if the speed is greater than that provided for (see Figure 2), the extremity 7 of the lever 6 is moved more far downwards, comparatively to the sector 5 at the end of the lever 4, so that the lever 10 has the effect of a pedal having a relatively fixed point at 8ª, when the fork 8 moves upwards entraining with it the finger 9 carried by the lever 10, this position of unequilibrium of the lever becoming established by reason, so to speak, of an excess of speed comparative to the time, the balance beam arbitrarily rises, in order to fix ideas, at the left, at 9, so as to take an inclined position with respect to the horizontal.

Figure 2:
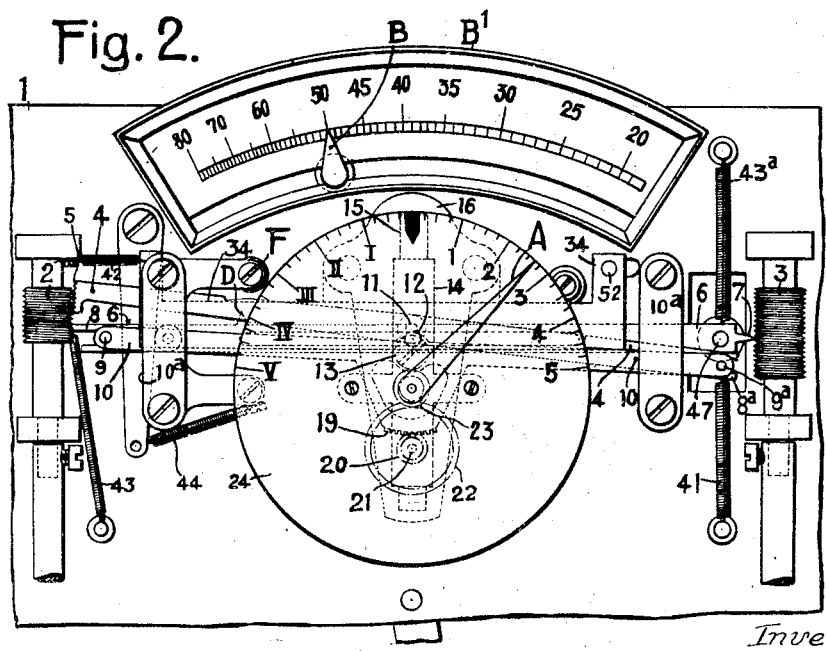
Figure 2 is also a front view of the apparatus, but the speed is not in comparative equilibrium with the time, so that the hand A has moved towards the right of the dial.

The positions of equilibrium and of unequilibrium of the lever 10 are indicated by the amplifying indicating members on a dial giving thereby an indication of the observance or of the non-observance of the desired mean speed. For this purpose the lever 10 is provided, at the middle of its length, with a toothed segment 19 which is in mesh with a pinion 20 firmly secured on its axle 21 on which is firmly secured an amplifying toothed wheel 22 which meshes with another pinion 23, the axle of which carries the indicating pointer A cooperating with a dial 24 which is shown in Figures 1 and 2 by a full circle and in Figure 3 by a dot and dash circle. The ensemble constituting the indicating device is mounted on the slide 14. In the position that the pointer A occupies in Figure 1, the lever 10 is in a position of equilibrium, the desired mean speed is being strictly observed. In the position that the pointer occupies in Figure 2 there is an advance at the speed side as compared with a lag at the time side, that is to say, the mean speed has been exceeded.

As shown in Figure 3 there is unequilibrium in the reverse sense, that is to say, there is a lag at the speed side as compared with an advance at the time side.

For rapidity in reading possible variations, the dial 24 can be provided with two kinds of numbers as represented in the drawing, those on the left indicating a lag behind, and those on the right an advance in the speed with respect to the selected mean speed, and a marked zone of three millimetres in breadth may be provided centrally at the top of the dial in order to permit of ascertaining perfect equilibrium between the time and the speed per hour indicated by the pointer B (Figures 1 and 2) on the scale B¹, members of which will be referred to hereinafter.

Assuming that the basic unit of time may be taken as invariable and that the endless screw 2 makes one revolution per hour and the endless screw 3 (speed side), one revolution per 50 kilometres, it follows that travelling at a speed of 50 kilometres an hour, the comparative equilibrium between time and speed is maintained, the lever 10 remaining in a horizontal position, the hand A remaining at the centre of the central zone of the dial, i. e. at zero. On the other hand, the dial 24 being fixed on the slide 14, as well as the ensemble constituting the indicating arrangements is displaced with the latter so long as the above conditions of speed are maintained.

Thus the lever 10 together with the indicating arrangements are displaced transversely to the longitudinal axis of the lever 10, the lever 10 inclining from the horizontal towards the left or towards the right according to whether the speed of the vehicle exceeds 50 km. per hour (the mean speed selected by way of example) or falls below the latter, the lever 10 occupying the horizontal position of equilibrium when the vehicle is travelling at the desired mean speed of 50 km. per hour.

Up to the present, in order to facilitate a clear comprehension of the apparatus, it has been considered that the pivotal point of the lever 4 was invariably at 11 and that of the lever 6 at 12; this is so in the case represented above where a mean speed of 50 km. per hour (Figure 1) is assumed to have been selected, i. e. when the index B indicates 50 on the scale $B^1$. But a vehicle can travel at a mean speed from 15 to 100 km. per hour for example. Therefore, in order to maintain in any case at any selected speed the lever 10 horizontal and maintain the pointer A in the central zone at zero, the apparatus comprises a portion that has already been referred to in passing.

Referring again to a speed of 50 km. per hour, as above, the pivotal point of the lever 4 (time member) is midway along its length at 11 and that of the lever 6 (speed member) also midway along its length at 12. As the unit of time is invariable, the pivotal point of the lever 4 (time member) will always remain midway along its length and its distance from each of its extremities will always be the same.

But it is otherwise with the lever 6 (speed member) which, the speed varying, will be subject owing to this fact to more or less displacement at its ends, a state of affairs which, in principle must be compensated in order to obtain equilibrium as compared with the time. To this end, means are provided to permit displacement of the pivotal point 12 of the lever 6.

It is to be understood that at 50 km. per hour, the pivotal point of the lever 6 will always be at 12. But assuming that it is desired to travel at 25 km. per hour maintaining constantly the pointer A at zero, it will be necessary to transfer the pivotal point 12 of the lever 6 to a point midway between the middle of the lever and its right hand end.

From the fact that the screw 3 (speed side) will only make, at 25 km. per hour, one half revolution per hour and that the finger 7 at the extremity of the lever 6 will only traverse one half of the distance traversed at a speed of 50 km., it should be considered that at its other extremity, owing to the displacement of the pivotal point, the displacement at 8 will be equal to that at a speed of 50 km. per hour. Thus in spite of the fact that the vehicle is only travelling 25 km. per hour, equilibrium of the balance lever 10 will be established, the latter will remain horizontal and the pointer A will indicate zero and similarly at any other speed. On the other hand it will be evident that should there be an advance in or lag behind the mean speed, the hand A will indicate more or less the variations, just as in the case of a speed of 50 km. per hour. It is moreover this adjustment that permits the driver to act in consequence on the control in order to maintain the selected mean speed.

It will now be understood why the finger 7 having a single tooth has been selected instead of an entire sector, because the distance between the pivotal point and the tooth 7 of the lever 6 is variable and theoretically this variability would render it necessary to impart to the toothed sector a variable radius, while a single tooth such as the finger 7 fulfils practically the conditions of correct entrainment with the endless screw 3, whatever the position of the pivotal point 12 of the lever 6.

Figure 8:
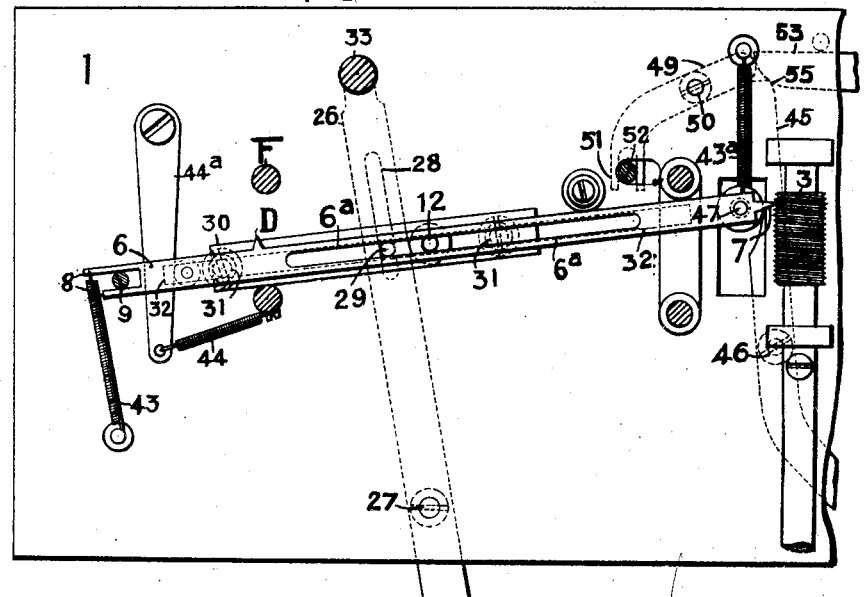
Figure 8 is a section on the line VIII—VIII of Figure 4.
Figure 9:
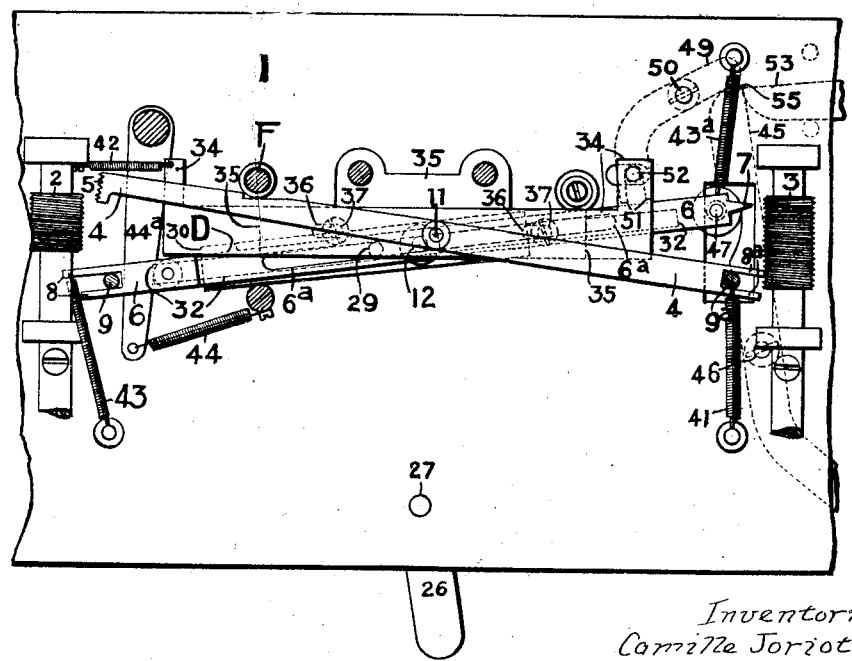
Figure 9 is a section on the line IX—IX of Figure 4, in another position of the parts.

The arrangements permitting the displacement of the pivotal point 12 of the lever 6, are illustrated in Figures 6, 7 and 8. They comprise a hand lever 26 pivotally mounted at 27 on the back of the plate 1 and having therein a slot 28, in which an entrainment finger 29 projects, the finger 29 being provided on a slide 30 lodged in a slot 32 of the plate 1 and maintained there by means of compass screw 31. At the end of the lever 26 a pin 33 is secured which carries at its upper extremity (not shown in section) the pointer B shown in plan in Figures 1 and 2. The slide 30 carries, at its front side the pivot 12 serving as the pivotal point of the lever 6, which has a longitudinal slot $6^a$ therein (Figures 1, 2, 7, 8 and 9) into which the pivot 12 projects.

It will be evident that by manipulating the lever 26 the pointer B can be moved so as to indicate the desired speed in kilometres per hour on the scale $B^1$ (Figure 1), but it is also evident that simultaneously the pivotal point 12 of the lever 6 is displaced, this being necessary in order to maintain the equilibrium of the balance lever as hereinbefore referred to.

Up to the present it has been supposed that the parts 5 and 7 were always engaged by the endless screws 2 and 3 respectively; they are so once the apparatus operates during travel, but it must however be arranged that the apparatus can be brought back to zero when desired. To this end, an arrangement of the members of the apparatus has been foreseen which will now be described.

In order to uncouple the parts 5 and 7 from the screws 2 and 3, a receding movement of the levers 4 and 6 must be effected. With this object in view, the lever 4 has its pivot 11 on a slide 34 adapted to slide on a plate 35 rigidly secured to the plate 1 by a pin 38. In the plate 35 slots 36 (Figure 3) are formed in which the screws 37 in the slide 34 are adapted to slide and which retain the latter by their heads. The lever 4 thus mounted is able to be displaced longitudinally from left to right and vice versa. The lever 6 is similarly arranged, the slot 6ª while permitting the displacement of the pivot 12, with the object above described, permitting also the backward movement of the lever 6 from its engagement with the endless screw 3.

The lever 4 is influenced by a spring 41 tending to move its extremity 5 upwards (Figure 2) and by a spring 42 tending to draw it into engagement with the endless screw 2. The lever 6 is influenced by springs 43 and 43ª tending to move its extremity 7 upwards (Figure 2) and by a spring 44 adapted to move it into engagement with the endless screw 3 by acting on a lever 44ª (Figure 8) applied to a roller on the lever 6.

Referring again to Figure 7 it can be seen that a manually operable bell crank lever 45 is pivoted at 46 and adapted to act on a pin 47 on the lever 6; at its extremity 48 the lever 45 comes into contact with another lever 49 pivoted at 50 and which is provided with a fork 51 straddling a pin 52 on the slide 34 carrying the pivot 11 of the lever 4.

It will thus be evident that by moving the lever 45 from right to left (as shown in Figure 7) the parts 5 and 7 are brought out of engagement with the endless screws 2 and then, these parts will rise, in moving along the length of the endless screws (without being engaged by them) so as to return to the point of departure and again be brought into engagement there as soon as the lever 45 is released, this lever being brought back by the springs of the associated members which on returning into engagement determine the reset to zero of the apparatus.

By considering all the preceding explanation, it will readily be understood that when the parts 5 and 7 reenter into engagement with their endless screws, the forks 8 and 8ª of the levers 6, 4 have carried the balance lever 10 downwards in a horizontal position together with all the arrangements connected thereto.

The lever 45 is associated with a lever 53 (Figure 7) pivoted at 54 which cooperates at 55 with the head 48 of the lever 45, this lever 53 permitting the lever 45 to be permanently secured in a position corresponding to the disengagement of the levers 4 and 6 from their endless screws 2 and 3, which then rotate idly without effecting entrainment, the apparatus thus remaining inoperative but having its endless screws 2 and 3 rotating.

It will be evident that a toothed sector in engagement with an endless screw cannot operate indefinitely without becoming disengaged. Accordingly after travelling for ten hours whatever the number of kilometres travelled, or after travelling 600 kilometres whatever the time taken to cover this distance the apparatus automatically becomes uncoupled in the following manner. After travelling for ten hours for example, the sector 5 falls off the end of the endless screw 2 at C (Figure 1) thus setting free the lever 4; on the other hand, the lever 6 is provided with a cam D, which after 600 km. for example have been travelled, comes into contact with the pillar F which causes the lever 6 to recede from the thread of the screw 2 so that it is set free, and ceases to descend at its end carrying the finger 7 and to ascend at its other extremity. There is therefore automatic uncoupling of the sector 5. These various arrangements avoid the breakage of the members of the apparatus through negligence, attention not being paid to the apparatus, leaving it in engagement or in any other case.

In order to utilize the apparatus advantageously, for a journey which it is wished to regulate, the pointer of the apparatus is brought back to zero and after the length of the journey to be made has been divided by the time practically possible dependent upon the time at which it is desired to complete the journey, the pointer B is moved so as to indicate the calculated number of kilometres per hour and in course of the journey the driver modifies the speed of his vehicle in such a way as to maintain the hand A in the central zone, at the zero mark. By thus constantly regulating his speed, he will arrive at predetermined time without travelling excessively fast or slow in order to do so.

Another way of utilizing the apparatus consists in obtaining after a journey has been completed a knowledge of the mean speed at which the vehicle has travelled. For this, before starting, the apparatus is brought to zero and the pointer B placed to the extreme right of the scale B¹. After the journey, whatever speed has been maintained by moving the pointer B to the left by the lever 26 until on the other hand, the pointer A moves to the zero mark in the central zone, the pointer B will then indicate on the scale B¹ the mean speed maintained throughout the journey.

The apparatus described above can render great service to automobiles and the like. It allows the speed of travel of a vehicle to be regulated in such a manner that a saving of the parts is effected (even the risk of accidents) it permits the driver to determine in advance the number of kilometres per hour to be effected in order to allow him to arrive at a predetermined hour by regulating the speed during the whole journey.

On the other hand it permits lag behind or advance in the required speed to be ascertained in the course of the journey and by this the kilometres lost or gained, permitting him constantly to modify the speed and provide for the consequences. The apparatus permits the mean speed effected to be ascertained after a journey.

What I claim is:

1. A speed indicating and comparing device for vehicles giving a comparison between the actual speed and a predetermined mean speed, comprising two comparative counter-balancing regulating mechanisms, the one arranged to be actuated in accordance with the time, the other arranged to be actuated in accordance with the speed, an indicating member, common combining means connecting said two regulating mechanisms with said indicating member to indicate the observance or non-observance of the desired mean speed, at least one of said regulating mechanisms being provided with manual controlling means for varying at will its selected basic speed serving as base of comparison.

2. A speed indicating and comparing device for vehicles giving a comparison between the actual speed and a predetermined mean speed, comprising two comparative counter-balancing regulating mechanisms, said comparative counter-balancing regulating mechanisms comprising two transfer levers, one arranged to be influenced in accordance with the time at one of the arms of the lever, the other arranged to be influenced in accordance with the speed of travel at the arm of the lever opposite to that of the first lever which is influenced by the time, a floating combining balance lever connected respectively with the other arms of said transfer levers and arranged to combine the oscillations thereof into an equilibrating or balancing movement, an indicating member adapted to receive this movement so as to indicate the observance or non-observance of the desired mean speed, the speed controlled transfer lever being provided with a manually operable controlling device for varying at will the relation between the effective lengths of the arms of this lever according to the speed which it is proposed to observe.

3. A speed indicating and comparing device for vehicles giving a comparison between the actual speed and a predetermined mean speed, comprising two comparative counter-balancing regulating mechanisms, said comparative counter-balancing regulating mechanisms comprising two transfer levers in combination with two rotary endless screws, one arranged to be rotated by a clock movement and the other arranged to be rotated by the travel of the vehicle, the said transfer levers having their arms in engagement, respectively, with said endless screws, a floating combining balance lever connected respectively with the other arms of said transfer levers and arranged to combine the oscillations thereof into an equilibrating or balancing movement, an indicating member adapted to receive this movement so as to indicate the observance or non-observance of the desired mean speed, the speed controlled transfer lever being provided with a manually operable controlling device for varying at will the relation between the effective lengths of the arms of this lever according to the speed which it is proposed to observe.

4. A speed indicating and comparing device for vehicles giving a comparison between the actual speed and a predetermined mean speed, comprising two comparative counter-balancing regulating mechanisms, said comparative counter-balancing regulating mechanisms comprising two transfer levers in combination with two rotary endless screws, one arranged to be rotated by a clock movement and the other arranged to be rotated by the travel of the vehicle, the said transfer levers having their arms in engagement, respectively, with said endless screws, a floating combining balance lever and a slide carrying same, adapted to move transversely to the longitudinal axis of this lever, said balance lever being connected respectively with the other arms of said transfer levers and arranged to combine the oscillations thereof into an equilibrating or balancing movement, an indicating member adapted to receive this movement so as to indicate the observance or non-observance of the desired mean speed, the speed controlled transfer lever being provided with a manually operable controlling device for varying at will the relation between the effective lengths of the arms of this lever according to the speed which it is proposed to observe.

5. A speed indicating and comparing device for vehicles giving a comparison between the actual speed and a predetermined mean speed, comprising two comparative counter-balancing regulating mechanisms, said comparative counter-balancing regulating mechanisms comprising two transfer levers, one arranged to be influenced in accordance with the time at one of the arms of the lever, the other arranged to be influenced in accordance with the speed of travel at the arm of the lever opposite to that of the first lever which is influenced by the time, a floating combining balance lever connected respectively with the other arms of said transfer levers and arranged to combine the oscillations thereof into an equilibrating or balancing movement, a slide carrying said balance lever and being adapted to move transversely to the longitudinal axis thereof, a toothed segment at the central portion of said balance lever, an amplifying gear meshing therewith, an indicating pointer controlled by said gear, these parts being also mounted on said slide, with the object of transmitting the movement of the combining balance lever resulting in the combined action of the two transfer levers, to the said indicating pointer.

6. A speed indicating and comparing device for vehicles giving a comparison between the actual speed and a predetermined mean speed, comprising two comparative counter-balancing regulating mechanisms, said comparative counter-balancing regulating mechanisms comprising two transfer levers, one arranged to be influenced in accordance with the time at one of the arms of the lever, the other arranged to be influenced in accordance with the speed of travel at the arm of the lever opposite to that of the first lever which is influenced by the time, a floating combining balance lever connected respectively with the other arms of said transfer levers and arranged to combine the oscillations thereof into an equilibrating or balancing movement, an indicating member adapted to receive this movement so as to indicate the observance or non-observance of the desired mean speed, a movable pivot for the speed controlled transfer lever, an operating member carrying said pivot, a longitudinal slot in the said lever to receive said pivot and to allow displacement thereof with respect to the lever by movement of the said operating member.

7. A speed indicating and comparing device for vehicles giving a comparison between the actual speed and a predetermined mean speed, comprising two comparative counter-balancing regulating mechanisms, said comparative counter-balancing regulating mechanisms comprising two transfer levers in combination with two rotary endless screws, one arranged to be rotated by a clock movement and the other arranged to be rotated owing to the travel of the vehicle, the time controlled transfer lever having at one arm a toothed sector engaging with the corresponding endless screw, the transfer lever adapted to be influenced by the speed having at one arm a single tooth engaging with the corresponding endless screw, a floating combining balance lever connected respectively with the other arms of said transfer levers and arranged to combine the oscillations thereof into an equilibrating or balancing movement, an indicating member adapted to receive this movement so as to indicate the observance or non-observance of the desired mean speed, the speed controlled transfer lever being provided with a manually operable controlling device for varying at will the relation between the effective lengths of the arms of this lever according to the speed which it is proposed to observe.

8. A speed indicating and comparing device for vehicles giving a comparison between the actual speed and a predetermined mean speed, comprising two comparative counter-balancing regulating mechanisms, said comparative counter balancing regulating mechanisms comprising two transfer levers in combination with two rotary endless screws, one arranged to be rotated by a clock movement and the other arranged to be rotated by the travel of the vehicle, the said transfer levers having their arms in engagement, respectively, with endless screws, a floating combining balance lever connected respectively with the other arms of said transfer levers and arranged to combine the oscillations thereof into an equilibrating or balancing movement, an indicating member adapted to receive this movement so as to indicate the observance or non-observance of the desired mean speed, the speed controlled transfer lever being provided with a manually operable controlling device for varying at will the relation between the effective lengths of the arms of this lever according to the speed which it is proposed to observe, means being provided for moving the said transfer levers out of engagement with their respective endless screws.

9. A speed indicating and comparing device for vehicles giving a comparison between the actual speed and a predetermined mean speed, comprising two comparative counter-balancing regulating mechanisms, said comparative counterbalancing regulating mechanisms comprising two transfer levers in combination with two rotary endless screws, one arranged to be rotated by a clock movement and the other arranged to be rotated by the travel of the vehicle, the said transfer levers having their arms in engagement, respectively, with endless screws, a floating combining balance lever connected respectively with the other arms of said transfer levers and arranged to combine the oscillations thereof into an equilibrating or balancing movement, an indicating member adapted to receive this movement so as to indicate the observance or non-observance of the desired mean speed, the speed controlled transfer lever being provided with a manually operable controlling device for varying at will the relation between the effective lengths of the arms of this lever according to the speed which it is proposed to observe, means being provided for moving the said transfer levers out of engagement with their respective endless screws and spring means being connected to the transfer levers to return same, when being disengaged from the endless screws, to the point of departure with respect thereto.

10. A speed indicating and comparing device for vehicles giving a comparison between the actual speed and a predetermined mean speed, comprising two comparative counterbalancing regulating mechanisms, said comparative counterbalancing regulating mechanisms comprising two transfer levers in combination with two rotary endless screws, one arranged to be rotated by a clock movement and the other arranged to be rotated by the travel of the vehicle, the said transfer levers having their arms in engagement, respectively, with endless screws, a floating combining balance lever connected respectively with the other arms of said transfer levers and arranged to combine the oscillations thereof into an equilibrating or balancing movement, an indicating member adapted to receive this movement so as to indicate the observance or non-observance of the desired mean speed, the speed controlled transfer lever being provided with a manually operable controlling device for varying at will the relation between the effective lengths of the arms of this lever according to the speed which it is proposed to observe, means being provided for moving the said transfer levers out of engagement with their respective endless screws and means being provided for maintaining the transfer levers in disengaged position.

11. A speed indicating and comparing device for vehicles giving a comparison between the actual speed and a predetermined mean speed, comprising two comparative counterbalancing regulating mechanisms, said comparative counterbalancing regulating mechanisms comprising two transfer levers in combination with two rotary endless screws, one arranged to be rotated by a clock movement and the other arranged to be rotated by the travel of the vehicle, the said transfer levers having their arms in engagement, respectively, with said endless screws, a floating combining balance lever connected respectively with the other arms of said transfer levers and arranged to combine the oscillations thereof into an equilibrating or balancing movement, an indicating member adapted to receive this movement so as to indicate the observance or non-observance of the desired means speed, the speed controlled transfer lever being provided with a manually operable controlling device for varying at will the relation between the effective lengths of the arms of this lever according to the speed which it is proposed to observe, means being provided for moving the said transfer levers out of engagement with their respective endless screws and means being associated to the speed controlled transfer lever for disengaging it automatically from its corresponding endless screw after a distance of a predetermined number of kilometers has been traversed.

12. A speed indicating and comparing device for vehicles giving a comparison between the actual speed and a predetermined mean speed, comprising two comparative counterbalancing regulating mechanisms, said comparative counterbalancing regulating mechanisms comprising two transfer levers, one arranged to be influenced in accordance with the time at one of the arms of the lever, the other arranged to be influenced in accordance with the speed of travel at the arm of the lever opposite to that of the first lever which is influenced by the time, a floating combining balance lever connected respectively with the other arms of said transfer levers and arranged to combine the oscillations thereof into an equilibrating or balancing movement, an indicating member adapted to receive this movement so as to indicate the observance or non-observance of the desired mean speed, a movable pivot for the speed controlled transfer lever, an operating member carrying said pivot, a longitudinal slot in the said lever to receive said pivot and to allow displacement thereof with respect to the lever by movement of the said operating member, and a pointer carried by said operating member for displacing the pivot of the speed controlled transfer lever and arranged to indicate by means of a scale the mean speed for which the apparatus has been set.

In witness whereof I have hereunto signed my name this 6th day of January, 1930.

CAMILLE JORIOT.